(12) United States Patent
Kurimoto et al.

(10) Patent No.: US 9,493,628 B2
(45) Date of Patent: Nov. 15, 2016

(54) HIGH RIGIDITY RUBBER MATERIAL

(71) Applicant: TOYODA GOSEI CO., LTD., Tokyo (JP)

(72) Inventors: Hidekazu Kurimoto, Kiyosu (JP); Hiroshi Yamaguchi, Kiyosu (JP); Naomi Nakashima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 2 days.

(21) Appl. No.: 13/659,669

(22) Filed: Oct. 24, 2012

(65) Prior Publication Data
US 2013/0109802 A1    May 2, 2013

(30) Foreign Application Priority Data

Oct. 27, 2011  (JP) .................. 2011-235851

(51) Int. Cl.
*C08L 23/16*    (2006.01)
*C08K 5/00*    (2006.01)

(52) U.S. Cl.
CPC .............. *C08K 5/0016* (2013.01); *C08L 23/16* (2013.01); *C08K 5/0025* (2013.01)

(58) Field of Classification Search
CPC ....... C08L 23/16; C08K 3/04; C08K 5/0016; C08K 5/0025
USPC ...................... 525/331.7, 331.8; 524/62, 574
See application file for complete search history.

(56) References Cited

U.S. PATENT DOCUMENTS

| 5,231,128 A | * | 7/1993 | Nakata et al. | ........... 524/445 |
| 2004/0106760 A1 | * | 6/2004 | Sassa | ............. 526/335 |

FOREIGN PATENT DOCUMENTS

| JP | 10-139950 A | 5/1998 |
| JP | 2000-344979 A | 12/2000 |
| JP | 2004-204924 | 7/2004 |
| JP | 2007-009129 A | 1/2007 |

OTHER PUBLICATIONS

JP 2004-204924 A (2004), machine translation, JPO Advanced Industrial Property Network (AIPN).*
Office Action dated Feb. 6, 2014 issued in corresponding JP patent application No. 2011-235851 (and English translation).

* cited by examiner

*Primary Examiner* — Susannah Chung
*Assistant Examiner* — Josephine Chang
(74) *Attorney, Agent, or Firm* — Posz Law Group, PLC

(57) ABSTRACT

The present invention relates to a rubber material containing an EPDM rubber composition containing an EPDM rubber, a carbon black, a softening agent, a vulcanizing agent and a sulfur compound, in which a blending amount of whole components from which the vulcanizing agent and the sulfur compound are excluded is from 300 to 400 parts by weight, and a total sulfur blending amount is from 1.0 to 2.8 parts by weight, in which a blending ratio of carbon black/softening agent is from 1.8 to 2.5, and in which the EPDM rubber composition has a Mooney viscosity of from 70 to 100 at 100° C., and a vulcanized composition thereof has a rate of rigidity change satisfying the following equation (1):

$$\{(30\% \text{ Modulus at } 100°\text{C.}/30\% \text{ modulus at } 23°\text{C.})-1\} \times 100\% \geq -10\% \quad (1).$$

13 Claims, No Drawings

HIGH RIGIDITY RUBBER MATERIAL

TECHNICAL FIELD

The present invention relates to a high rigidity rubber material having small temperature dependence.

BACKGROUND ART

Wall thinning of rubber hoses or the other rubber products has been studied for the purpose of reduction in weight and cost, and as one technique therefor, high rigidity rubber materials have been utilized. In order to increase rigidity of rubber materials, it is common to increase the amount of a carbon black as a reinforcing agent or to add a thermoplastic resin. However, these exhibit high rigidity in an ordinary temperature region, but are ineffective in a high temperature region.

Patent Document 1 discloses a rubber material of a sulfur vulcanization system, in which 150 to 250 parts by weight of a carbon black is blended with 100 parts by weight of Ethylene-Propylene-Diene Methylene linkage (EPDM), as a rubber material for oil-resistant hoses. In this blending system, however, stress characteristics applicable to thin-walled products cannot be obtained.

Patent Document 1: JP-A-2004-204924

SUMMARY OF THE INVENTION

Accordingly, the present invention provides a high rigidity rubber material having small temperature dependence over a wide temperature range from ordinary temperature to high temperature, while securing high rigidity also in the high temperature region.

Incidentally, the term "ordinary temperature" in the present invention means a temperature ranging from 20° C. to 25° C., and the term "high temperature" means a temperature ranging from 100° C. to 110° C.

The present invention provides a rubber material containing an EPDM rubber composition, in which the EPDM rubber composition contains an EPDM rubber, a carbon black, a softening agent, a vulcanizing agent, and a sulfur compound, in which, based on 100 parts by weight of the EPDM rubber, a blending amount of the carbon black is 135 to 180 parts by weight, a blending amount of the softening agent is 55 to 100 parts by weight, a blending amount of whole components from which the vulcanizing agent and the sulfur compound are excluded is from 300 to 400 parts by weight, and a total sulfur blending amount is from 1.0 to 2.8 parts by weight, in which a blending ratio of carbon black/softening agent is from 1.8 to 2.5, and in which the EPDM rubber composition has a Mooney viscosity of from 70 to 100 at 100° C., and a vulcanized composition thereof has a rate of rigidity change satisfying the following equation (1):

$$\{(30\% \text{ Modulus at } 100° \text{ C.}/30\% \text{ modulus at } 23° \text{ C.})-1\}\times 100\% \geq -10\% \quad (1).$$

In the rubber material according to the present invention, the total sulfur blending amount may be an amount obtained by adding a sulfur amount corresponding to a sulfur content of a sulfur compound blending amount to a sulfur blending amount.

Further, in the rubber material according to the present invention, the sulfur compound is preferably at least one selected from the group consisting of a morpholine disulfide and a vulcanization accelerator which releases sulfur at the time of vulcanization.

Further, in the rubber material according to the present invention, the vulcanization accelerator is preferably a thiuram vulcanization accelerator and/or a thiazole vulcanization accelerator.

Further, the vulcanized composition of the EPDM rubber composition according to the present invention preferably has a 30% modulus at 23° C. of 1.4 MPa or more, and more preferably, has a 30% modulus at 23° C. of 2.0 MPa or less.

The present invention can provide the high rigidity rubber material having a small rate of rigidity change in a wide temperature region.

DETAILED DESCRIPTION OF THE INVENTION

Embodiments of respective elements in the present invention will be exemplified below.

1. EPDM Rubber

The EPDM rubber is not particularly limited, and it is preferred to have a Mooney viscosity at 125° C. (ML(1+4) 125° C.) of from 40 to 200, a diene content of from 4 to 7% by mass, and an ethylene content of from 40 to 70% by mass. When workability or the like is considered, a blended material may be appropriately used.

2. Vulcanizing Agent (Sulfur)

A powdered sulfur having a residue of not more than 3% on a 75 μm sieve is preferred.

3. Sulfur Compound

Examples of sulfur compounds include morpholine disulfides, vulcanization accelerators which release sulfur at the time of vulcanization, alkylphenol disulfides, polymeric polysulfides and the like. The sulfur compound is preferably at least one selected from the group consisting of the morpholine disulfides and the vulcanization accelerators which release sulfur at the time of vulcanization. Examples of the vulcanization accelerators which release sulfur at the time of vulcanization include thiuram vulcanization accelerators, thiazole vulcanization accelerators and the like.

4. Total Sulfur Blending Amount, Sulfur Blending Amount and Sulfur Compound Blending Amount The total sulfur blending amount means an amount obtained by adding the sulfur amount corresponding to the sulfur content of the sulfur compound blending amount to the sulfur blending amount. In other word, the total sulfur blending amount means a total amount of the sulfur amount corresponding to the sulfur content of the sulfur compound blending amount and the sulfur blending amount. When the total sulfur blending amount is from 1.0 to 2.8 parts by weight based on 100 parts by weight of the EPDM rubber, the high rigidity rubber material suppressed a decrease in rigidity in the high temperature region can be obtained. When the total sulfur blending amount is less than 1.0 part by weight, the rigidity of the rubber material at 100° C. decreases. The higher total sulfur blending amount intends to improve the rate of rigidity change easily, but when the total sulfur blending amount exceeds 2.8 parts by weight, the rubber material becomes too hard. Further, when the ratio of the EPDM rubber blending amount in the EPDM rubber composition is small, it tends to be necessary to increase the total sulfur blending amount in order to achieve the intended rate of rigidity change. Accordingly, in order to achieve the intended rate of rigidity change, it is effective to increase the ratio of the total sulfur blending amount or the ratio of the EPDM rubber blending amount.

As for the respective blending amount the sulfur and the sulfur compound, based on 100 parts by weight of the EPDM rubber, the sulfur blending amount is preferably from 0.4 to 2.3 parts by weight, and the sulfur compound blending amount is preferably from 0.7 to 5.0 parts by weight (the sulfur amount corresponding to the sulfur content thereof is preferably from 0.2 to 0.9 parts by weight).

5. Other Compounding Agents

Carbon Black

A carbon black having the basic characteristics of an iodine adsorption of from 30 mg/g to 80 mg/g and a DBP absorption of from 80 cm$^3$/100 g to 140 cm$^3$/100 g, in accordance with JIS K 6217 (1997), can be suitably employed.

Incidentally, the blending amount of the carbon black is preferably from 135 to 180 parts by weight based on 100 parts by weight of the EPDM rubber.

Softening Agent

A paraffinic softening agent having a dynamic viscosity of 360 to 400 mm$^2$/S (measured in accordance with JIS K 2283 (2000)) can be suitably employed.

The blending amount of the softening agent is preferably from 55 to 100 parts by weight based on 100 parts by weight of the EPDM rubber.

Incidentally, in the EPDM rubber composition, the blending ratio of carbon black/softening agent (a ratio of an amount of the carbon black to an amount of the softening agent) is set to from 1.8 to 2.5.

Others

There can be appropriately blended a vulcanization accelerating aid, an antioxidant, a processing aid, an inorganic filler and the like.

Incidentally, in the EPDM rubber composition, the blending amount of whole components from which the vulcanizing agent and the sulfur compound are excluded is set to from 300 to 400 parts by weight based on 100 parts by weight of EPDM rubber.

6. EPDM Rubber Composition

The EPDM rubber composition, which contains the above mentioned components, has a Mooney viscosity of from 70 to 100 at 100° C., and a vulcanized composition thereof has a rate of rigidity change satisfying the following equation (1):

$$\{(30\% \text{ Modulus at } 100° \text{ C.}/30\% \text{ modulus at } 23° \text{ C.})-1\} \times 100\% \geq -10\% \quad (1).$$

Further, the vulcanized composition of the EPDM rubber composition preferably has a 30% modulus at 23° C. of 1.4 MPa or more, and more preferably, has a 30% modulus at 23° C. of 2.0 MPa or less.

Use

As a use of the high rigidity rubber material of the present invention, there can be exemplified automotive parts whose temperature becomes high at the time of use, such as air cleaner hoses, water hoses and seal parts.

EXAMPLES

In order to measure the rigidity and the like at the time of changing the total sulfur blending amount, the blending amount of total components excluding a vulcanizing agent and a sulfur compound and the blending amounts of sulfur, various sulfur compounds, a carbon black and a softening agent as respective compounding agents, 1.6 kinds of samples of Examples and 11 kinds of samples of Comparative Examples were prepared (described in Table 3), appropriately changing the kind and blending amount of compounding agents based on the recipe of Table 1.

TABLE 1

| Material Name | Grade | Blending Amount Parts by weight | |
|---|---|---|---|
| EPDM | EPT 3090EM (oil extended, 10 parts) Mooney viscosity at 125° C.: 59 Diene content: 5.2% Ethylene content: 48% | 110 [a] | Constant |
| Carbon Black | FEF | 135~180 | Variable |
| Softening Agent | Paraffinic oil | 45~90 | Variable |
| Zinc White | META-Z102 | 5 | Constant |
| Stearic Acid | LUNAC S50V | 1 | Constant |
| Processing Aid | Aliphatic-based | 4 | Constant |
| Blending Amount of Total Components Excluding Vulcanizing Agent and Sulfur Compound | | 300~390 | Variable |
| Vulcanizing Agent Sulfur | Powdered sulfur | 0.4~2.3 | Variable |
| Vulcanization Compound Accelerator | NOCCELER TFT-G (11%) [b] | 0~0.5 | Variable |
| | NOCCELER TRA (25%) [b] | 0~1 | Variable |
| | NOCCELER MDB-P (11%) [b] | 0~2 | Variable |
| | NOCCELER TT (13%) [b] | 0~0.5 | Variable |
| Organic Vulcanizing Agent | VULNOC R (27%) [b] | 0~1 | Variable |

[a] EPDM as a raw material contains 10 parts of oil. Therefore, the content "110 parts" in Table 1 includes 10 parts of oil. Since the oil acts as a softening agent, the content of 10 parts of oil is included in the amount of softening agent in Table 2.
[b] The value in parenthesis is the sulfur content.

Four levels of the blending amount of total components excluding a vulcanizing agent and a sulfur compound, 6 levels of the sulfur blending amount, 3 to 5 levels of the kind of sulfur compound, 4 levels of the sulfur compound blending amount, and 12 levels of the total sulfur blending amount were combined for studies. As the sulfur compounds, there were used a morpholine disulfide (VULNOC R), thiuram vulcanization accelerators (NOCCELER TET-G, NOCCELER TRA and NOCCELER TT) and a thiazole vulcanization accelerator (NOCCELER MDB-P) as vulcanization accelerators which releases sulfur at the time of vulcanization, and studies were made with 3 to 5 kinds of combinations thereof.

In Table 1, the sulfur content of the respective vulcanization accelerators and VULNOC R is shown in parenthesis, and the blending amount corresponding to the sulfur content thereof is also described.

The 4 levels of the blending amount of total components excluding a vulcanizing agent and a sulfur compound were amounts in which respective combinations of the amount of the carbon black and the amount of the softening agent described in Table 2 were added to constant blending amounts of the other compounding agent and EPDM. Incidentally, the other compounding agent in Table 2 consists of zinc white, stearic acid and processing aid shown in Table 1.

Incidentally, as the carbon black, there was used FEF having an iodine adsorption of 44 mg/g and a DBP absorption of 115 cm$^3$/100 g (in accordance with JIS K 6217 (1997)). Further, the softening agent used was a paraffinic oil having a dynamic viscosity of 380 mm²/S (measured in accordance with JIS K 2283 (2000)).

TABLE 2

|  | Blending 1 | Blending 2 | Blending 3 | Blending 4 |
|---|---|---|---|---|
| Amount of EPDM [c] | 100 | 100 | 100 | 100 |
| Amount of Carbon Black [c] | 135 | 150 | 165 | 180 |
| Amount of Softening Agent [c] | 55 | 70 | 85 | 100 |
| Amount of Carbon Black/Amount of Softening Agent | 2.45 | 2.14 | 1.94 | 1.80 |
| Amount of Other Compounding Agent [c] | 10 | 10 | 10 | 10 |
| Blending Amount of Total Components Excluding Vulcanizing Agent and Sulfur Compound [c] | 300 | 330 | 360 | 390 |

[c] Unit: parts by weight

In Table 3, there are shown the measured data of the Mooney viscosity at 100° C., the 30% modulus at 23° C. (measurement of ordinary-temperature rigidity) and the 30% modulus at 100° C. (measurement of high-temperature rigidity), and the rate of rigidity change of each sample.

Incidentally, except for the Mooney viscosity at 100° C., the data were measured for each vulcanized rubber. The vulcanization was performed by press vulcanization at 170° C. for 10 minutes to prepare each sample.

Measuring methods in the respective tests will be described below.

<Mooney Viscosity>

The Mooney viscosity (ML(1+4) 100° C.) was measured by preheating the sample at a temperature of 100° C. for 1 minute using an L-type rotor, and rotating the rotor for 4 minutes, in accordance with JIS K 6300-1 (1994).

<30% Elongation Moduli>

Moduli at 30% elongation at 23° C. and 100° C. were each measured in accordance with JIS K 6251 (2010). Incidentally, the rate of rigidity change was determined from the following equation:

$$\{(30\% \text{ Modulus at } 100°\text{ C.}/30\% \text{ modulus at } 23°\text{ C.})-1\} \times 100\%.$$

From the measurement results based on the compounding contents shown in Tables 2 and 3, it is revealed that when the EPDM rubber composition comprising 135 to 180 parts by weight of the carbon black and 55 to 100 parts by weight of the softening agent and having a carbon black/softening agent blending ratio of from 1.8 to 2.5, a blending amount of the total components excluding the vulcanizing agent and the sulfur compound of from 300 to 400 parts by weight, and a total sulfur blending amount of from 1.0 to 2.8 parts by weight (0.4 to 2.3 parts by weight of sulfur and 0.2 to 0.9 parts by weight of the sulfur amount corresponding to the sulfur content of the sulfur compound), based on 100 parts by weight of the EPDM rubber, has a Mooney viscosity at 100° C. of from 70 to 100, the rate of rigidity change becomes larger than −10%. That is to say, it is revealed that the samples obtained in Examples have a small rate of rigidity change in a temperature region ranging from 23° C. to 100° C. On the other hand, the samples obtained in Comparative Examples have a rate of rigidity change of less than −10%.

TABLE 3

|  | Blending of Table 2 | Sulfur Blending Amount (a) [d] | Sulfur Content in Sulfur Compounds (b) [d] | Total Sulfur Blending Amount (a) + (b) [d] | Mooney Viscosity [e] | 23° C., 30% Modulus (MPa) [f] | 100° C., 30% Modulus (MPa) [g] | Rate of Rigidity Change (%) |
|---|---|---|---|---|---|---|---|---|
| Ex. 1 | Blending 1 | 0.4 | 0.9 | 1.3 | 100 | 1.75 | 1.63 | −7 |
| Comp. Ex. 1 | Blending 2 | 0.4 | 0.9 | 1.3 | 90 | 1.64 | 1.46 | −11 |
| Comp. Ex. 2 | Blending 1 | 0.4 | 0.6 | 1.0 | 100 | 1.75 | 1.56 | −11 |
| Ex. 2 | Blending 1 | 0.8 | 0.9 | 1.7 | 100 | 1.80 | 1.71 | −5 |
| Ex. 3 | Blending 2 | 0.8 | 0.9 | 1.7 | 90 | 1.67 | 1.54 | −8 |
| Comp. Ex. 3 | Blending 3 | 0.8 | 0.9 | 1.7 | 80.0 | 1.54 | 1.37 | −11 |
| Ex. 4 | Blending 1 | 0.8 | 0.6 | 1.4 | 100 | 1.71 | 1.57 | −8 |
| Comp. Ex. 4 | Blending 2 | 0.8 | 0.6 | 1.4 | 90 | 1.58 | 1.41 | −11 |
| Ex. 5 | Blending 1 | 0.8 | 0.4 | 1.2 | 100 | 1.64 | 1.48 | −10 |
| Comp. Ex. 5 | Blending 1 | 0.8 | 0.2 | 1.0 | 100 | 1.58 | 1.39 | −12 |
| Ex. 6 | Blending 1 | 1.1 | 0.4 | 1.5 | 100 | 1.67 | 1.54 | −8 |
| Comp. Ex. 6 | Blending 2 | 1.1 | 0.4 | 1.5 | 90 | 1.57 | 1.38 | −12 |
| Comp. Ex. 7 | Blending 1 | 1.1 | 0.2 | 1.3 | 100 | 1.45 | 1.29 | −11 |
| Ex. 7 | Blending 1 | 1.5 | 0.2 | 1.7 | 100 | 1.66 | 1.54 | −7 |
| Comp. Ex. 8 | Blending 2 | 1.5 | 0.2 | 1.7 | 90 | 1.56 | 1.37 | −12 |
| Ex. 8 | Blending 2 | 1.5 | 0.4 | 1.9 | 90 | 1.60 | 1.46 | −9 |
| Comp. Ex. 9 | Blending 3 | 1.5 | 0.4 | 1.9 | 80 | 1.47 | 1.29 | −12 |
| Ex. 9 | Blending 3 | 1.5 | 0.6 | 2.1 | 80 | 1.53 | 1.38 | −10 |
| Ex. 10 | Blending 3 | 1.5 | 0.9 | 2.4 | 80 | 1.63 | 1.52 | −7 |
| Ex. 11 | Blending 4 | 1.5 | 0.9 | 2.4 | 70 | 1.48 | 1.35 | −9 |
| Comp. Ex. 10 | Blending 4 | 1.5 | 0.6 | 2.1 | 70 | 1.39 | 1.22 | −12 |
| Ex. 12 | Blending 3 | 1.9 | 0.4 | 2.3 | 80 | 1.52 | 1.38 | −9 |
| Comp. Ex. 11 | Blending 4 | 1.9 | 0.4 | 2.3 | 70 | 1.38 | 1.21 | −12 |
| Ex. 13 | Blending 4 | 1.9 | 0.6 | 2.5 | 70 | 1.44 | 1.30 | −10 |
| Ex. 14 | Blending 4 | 1.9 | 0.9 | 2.8 | 70 | 1.54 | 1.43 | −7 |
| Ex. 15 | Blending 3 | 2.3 | 0.2 | 2.5 | 80 | 1.51 | 1.37 | −9 |
| Ex. 16 | Blending 2 | 2.3 | 0.2 | 2.5 | 90 | 1.64 | 1.54 | −6 |

[d] Unit: Parts by weight
[e] At 100° C.
[f] Rigidity at ordinary temperature
[g] Rigidity at high temperature While the present invention has been described in detail with reference to the specific embodiments thereof, it will be apparent to one skilled in the art that various changes and modifications can be made therein without departing from the spirit and scope of the present invention.

The present application is based on the Japanese Patent Application No. 2011-235851 filed on Oct. 27, 2011, and the entire contents thereof are incorporated herein by reference. All references cited herein are incorporated in their entirety.

What is claimed is:

1. A rubber hose material made of an EPDM rubber composition, the EPDM rubber composition consisting essentially of:
   100 parts by weight of an EPDM rubber blended together with:
   135 to 180 parts by weight carbon black;
   55 to 100 parts by weight a softening agent;
   a blending ratio of carbon black/softening agent being from 1.8 to 2.5;
   0.4 to 1.5 parts by weight of powdered sulfur as a vulcanizing agent;
   0.4 to 0.9 parts by weight of sulfur contained within a sulfur compound selected from the group consisting of sulfur compounds that release sulfur at the time of vulcanization;
   1.0 to 1.7 parts by weight of a total sulfur blending amount, the total sulfur blending amount including the weight of the powdered sulfur and the weight of the sulfur contained within the sulfur compound; and
   a blending amount of all components of the EPDM rubber composition from which the powdered sulfur as a vulcanizing agent and the sulfur compound are excluded is from 300 to 400 parts by weight,
   wherein the EPDM rubber composition has a Mooney viscosity of 100 at 100° C., and a vulcanized composition thereof has a rate of rigidity change satisfying the following equation (1):

$$\{(30\% \text{ Modulus at } 100°\text{ C.}/30\% \text{ modulus at } 23°\text{ C.})-1\}\times 100\% \geq -10\% \quad (1).$$

2. The rubber hose material according to claim 1, wherein the sulfur compound is at least one selected from the group consisting of a morpholine disulfide and a vulcanization accelerator which releases sulfur at the time of vulcanization.

3. The rubber hose material according to claim 2, wherein the vulcanization accelerator is a thiuram vulcanization accelerator and/or a thiazole vulcanization accelerator.

4. The rubber hose material according to claim 1, wherein the vulcanized composition of the EPDM rubber composition has a 30% modulus at 23° C. of 1.4 MPa or more.

5. The rubber hose material according to claim 4, wherein the vulcanized composition of the EPDM rubber composition has a 30% modulus at 23° C. of 2.0 MPa or less.

6. A rubber hose material made of an EPDM rubber composition, the EPDM rubber composition consisting essentially of:
   100 parts by weight of an EPDM rubber blended together with:
   135 to 180 parts by weight carbon black;
   55 to 100 parts by weight a softening agent;
   a blending ratio of carbon black/softening agent being from 1.8 to 2.5;
   0.4 to 2.3 parts by weight of powdered sulfur as a vulcanizing agent;
   0.4 to 0.9 parts by weight of sulfur contained within a sulfur compound selected from the group consisting of sulfur compounds that release sulfur at the time of vulcanization;
   1.7 to 2.5 parts by weight of a total sulfur blending amount, the total sulfur blending amount including the weight of the powdered sulfur and the weight of the sulfur contained within the sulfur compound; and
   a blending amount of all components of the EPDM rubber composition from which the sulfur as a vulcanizing agent and the sulfur compound are excluded is from 300 to 400 parts by weight,
   wherein the EPDM rubber composition has a Mooney viscosity of 90 at 100° C. and a vulcanized composition thereof has a rate of rigidity change satisfying the following equation (1):

$$\{(30\% \text{ Modulus at } 100°\text{ C.}/30\% \text{ modulus at } 23°\text{ C.})-1\}\times 100\% \geq -10\% \quad (1).$$

7. A rubber hose material made of an EPDM rubber composition, the EPDM rubber composition consisting essentially of:
   100 parts by weight of an EPDM rubber blended together with:
   135 to 180 parts by weight carbon black;
   55 to 100 parts by weight a softening agent;
   a blending ratio of carbon black/softening agent being from 1.8 to 2.5;
   0.4 to 2.3 parts by weight of powdered sulfur as a vulcanizing agent;
   0.4 to 0.9 parts by weight of sulfur contained within a sulfur compound selected from the group consisting of sulfur compounds that release sulfur at the time of vulcanization;
   2.1 to 2.5 parts by weight of a total sulfur blending amount, the total sulfur blending amount including the weight of the powdered sulfur and the weight of the sulfur contained within the sulfur compound; and
   a blending amount of all components of the EPDM rubber composition from which the powdered sulfur as a vulcanizing agent and the sulfur compound are excluded is from 300 to 400 parts by weight,
   wherein the EPDM rubber composition has a Mooney viscosity of 80 at 100° C. and a vulcanized composition thereof has a rate of rigidity change satisfying the following equation (1):

$$\{(30\% \text{ Modulus at } 100°\text{ C.}/30\% \text{ modulus at } 23°\text{ C.})-1\}\times 100\% \geq -10\% \quad (1).$$

8. A rubber hose material made of an EPDM rubber composition, the EPDM rubber composition consisting essentially of:
   100 parts by weight of an EPDM rubber blended together with:
   135 to 180 parts by weight carbon black;
   55 to 100 parts by weight a softening agent;
   a blending ratio of carbon black/softening agent being from 1.8 to 2.5;
   0.4 to 1.9 parts by weight of powdered sulfur as a vulcanizing agent;
   0.4 to 0.9 parts by weight of sulfur contained within a sulfur compound selected from the group consisting of sulfur compounds that release sulfur at the time of vulcanization;
   2.4 to 2.8 parts by weight of a total sulfur blending amount, the total sulfur blending amount including the weight of the powdered sulfur and the weight of the sulfur contained within the sulfur compound; and a blending amount of all components of the EPDM rubber composition from which the powdered sulfur as a vulcanizing agent and the sulfur compound are excluded is from 300 to 400 parts by weight, wherein the EPDM rubber composition has a Mooney viscosity of 70 at 100° C. and a vulcanized composition thereof has a rate of rigidity change satisfying the following equation (1):

$$\{(30\% \text{ Modulus at } 100° \text{ C.}/30\% \text{ modulus at } 23° \text{ C.})-1\} \times 100\% \geq -10\% \quad (1).$$

9. A rubber hose made of an EPDM rubber composition, the EPDM rubber composition consisting essentially of:
   an EPDM rubber and based on 100 parts by weight of the EPDM rubber:
   a blending amount of carbon black of 135 to 180 parts by weight;
   a blending amount of softening agent of 55 to 100 parts by weight;
   a total blending amount of sulfur of 1.0 to 2.8 parts by weight, the total blending amount of sulfur including 0.4 to 2.3 parts by weight of powdered sulfur and 0.4 to 0.9 parts by weight of sulfur obtained from a sulfur compound;
   a blending ratio of carbon black/softening agent is from 1.8 to 2.5; and
   a blending amount of components in the EPDM rubber composition other than the vulcanizing agent and the total blending amount of sulfur is from 300 to 400 parts by weight,
   wherein the EPDM rubber composition has a Mooney viscosity of from 70 to 100 at 100° C., and a vulcanized composition of the EPDM rubber composition has a rate of rigidity change satisfying the following equation (1):

$$\{(30\% \text{ Modulus at } 100° \text{ C.}/30\% \text{ modulus at } 23° \text{ C.})-1\} \times 100\% \geq -10\% \quad (1).$$

10. The rubber hose according to claim 9, wherein the sulfur compound is at least one selected from the group consisting of a morpholine disulfide, alkyl phenol disulfides, polymeric polysulfides and a vulcanization accelerator which releases sulfur at a time of vulcanization.

11. The rubber hose according to claim 10, wherein the vulcanization accelerator is a thiuram vulcanization accelerator and/or a thiazole vulcanization accelerator.

12. The rubber hose according to claim 9, wherein the vulcanized composition of the EPDM rubber composition has a 30% modulus at 23° C. of 1.4 MPa or more up to 2.0 MPa or less.

13. The rubber hose according to claim 9,
    wherein an amount of the powdered sulfur, a total sulfur blending amount, and a Mooney viscosity of the vulcanized EPDM rubber are selected from one of the following groupings:
    0.4 to 1.5 parts by weight of the sulfur, where the total sulfur blending amount is 1.0 to 1.7 parts by weight, and the EPDM rubber composition has a Mooney viscosity of 100 at 100° C.;
    0.4 to 2.3 parts by weight of the sulfur, where the total sulfur blending amount is 1.7 to 2.5 parts by weight, and the vulcanized EPDM rubber composition has a Mooney viscosity of 90 at 100° C.;
    0.4 to 2.3 parts by weight of the sulfur, where the total sulfur blending amount is 2.1 to 2.5 parts by weight, and the vulcanized EPDM rubber composition has a Mooney viscosity of 80 at 100° C.; and
    0.4 to 1.9 parts by weight of the sulfur, where the total sulfur blending amount is 2.4 to 2.8 parts by weight, and the vulcanized EPDM rubber composition has a Mooney viscosity of 70 at 100° C.

* * * * *